United States Patent
Huber et al.

(10) Patent No.: US 6,603,736 B1
(45) Date of Patent: Aug. 5, 2003

(54) COMMUNICATION DEVICE FOR TRANSMITTING MESSAGE SIGNALS

(75) Inventors: Siegfried Huber, Reichertshofen (DE); Joachim Klink, München (DE); Klaus Ziemann, Landshut (DE); Jörg Köpp, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/486,349

(22) PCT Filed: Aug. 11, 1998

(86) PCT No.: PCT/DE98/02308

§ 371 (c)(1),
(2), (4) Date: Feb. 25, 2000

(87) PCT Pub. No.: WO99/11031

PCT Pub. Date: Mar. 4, 1999

(30) Foreign Application Priority Data

Aug. 27, 1997 (DE) .......................................... 197 37 359

(51) Int. Cl.[7] .............................................. H04L 12/56
(52) U.S. Cl. ...................................... 370/228; 370/220
(58) Field of Search ................................. 370/217–228

(56) References Cited

U.S. PATENT DOCUMENTS 4,497,054 A * 1/1985 Read .......................... 370/220
5,325,354 A * 6/1994 Hadano ...................... 370/228
5,331,631 A   7/1994 Teraslinna

FOREIGN PATENT DOCUMENTS

EP        0 187 067 B1    7/1986

OTHER PUBLICATIONS

Kai Y. Eng et al., "Memory– and Channel–Sharing Techniques for Congestion Control in ATM Networks", Networking: Foundation for the Future, vol. 1, No. 12, XP000419741, IEEE, pp. 266–273 (1993).

Erin P. Rathgeb, et al, "The MainStreetXpress Core Services Node—A Versatile ATM Switch Architecture for the Full Service Network", IEEE Journal on Selected Areas in Communications, vol. 15, No. 5, (1997), XP 000657033, pp. 795–806.

Hermann Barth et al, "Ersatzschalteinrichtungen für Digitalrichtfunkverbindungen", Telcom Report 9, (1986), Sonderheft, etc., pp. 181–186.

* cited by examiner

Primary Examiner—Salvatore Cangialosi
(74) Attorney, Agent, or Firm—Fish & Richardson P.C.

(57) ABSTRACT

The communication device (KE) has a coupling arrangement (ASN) with at least a number N of active line assemblies (BG 1 to BG N), which are respectively connected to a transmission line (LTG 1 to LTG N) and, together with an additional standby line assembly (BG N+1), form a "1:N" redundancy group. In such a "1:N" redundancy group, line-specific switches (S) and selection devices (SEL 1:N) are designed and arranged in such a manner that the selection devices can be replaced without adversely affecting the normal operation of the communication device.

7 Claims, 3 Drawing Sheets

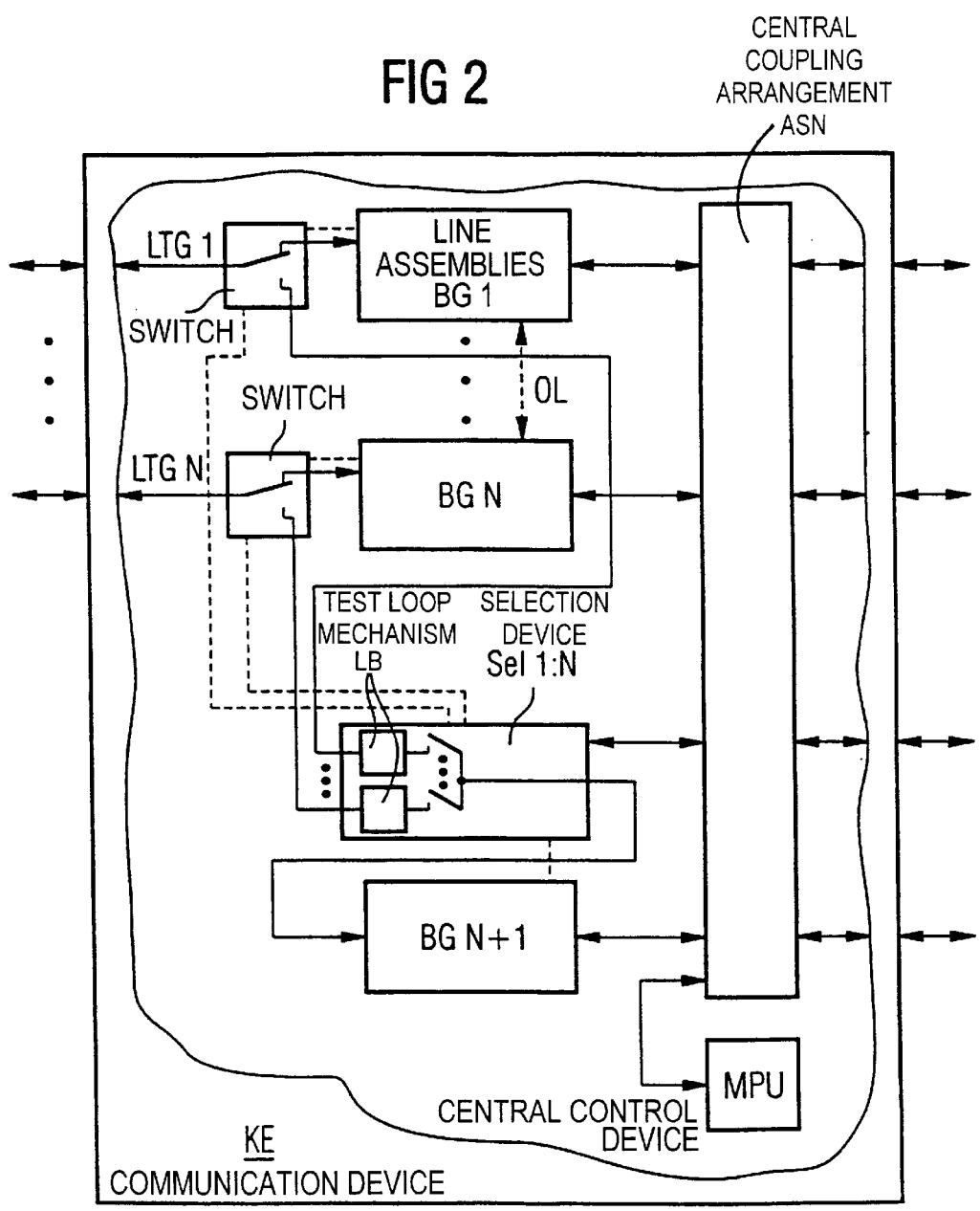

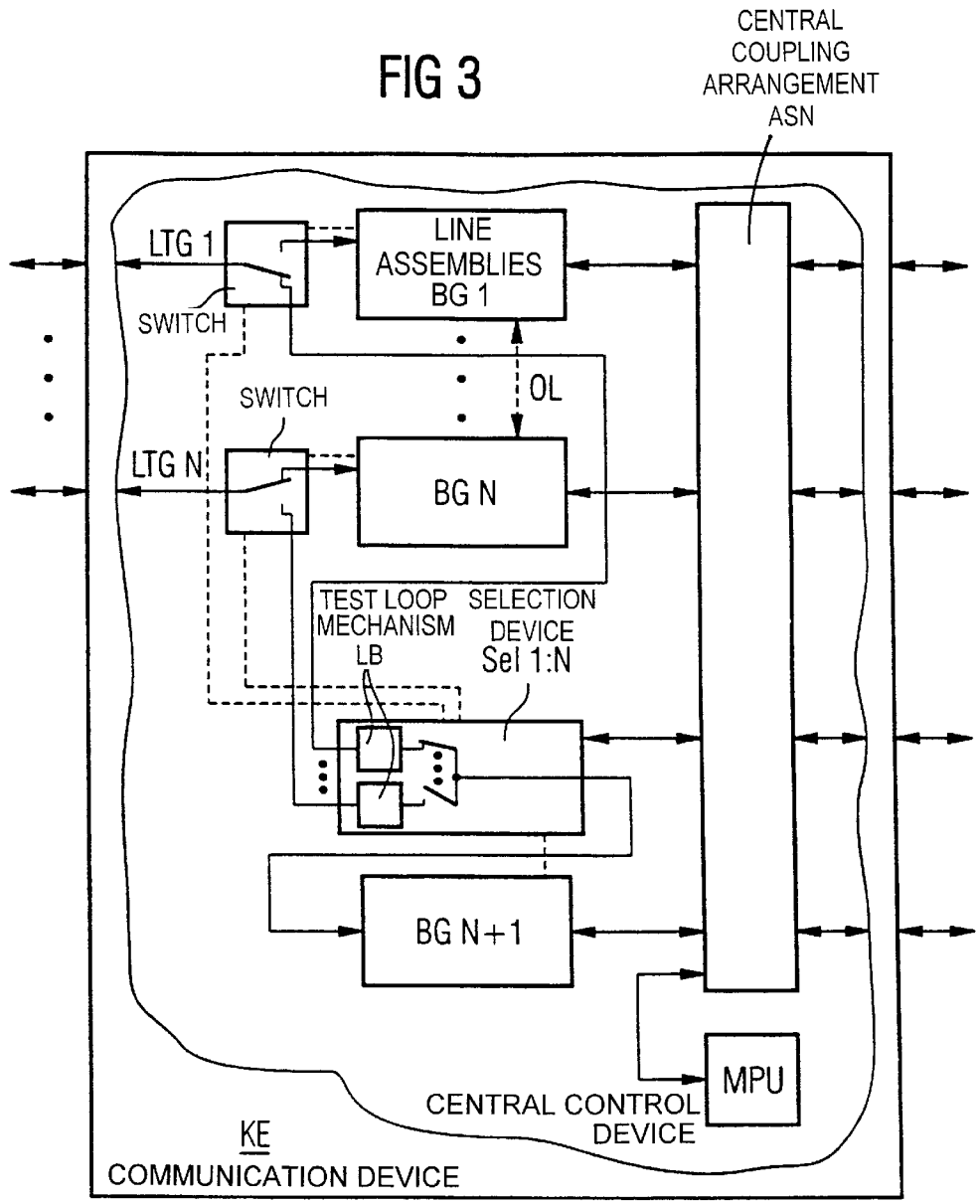

COMMUNICATION DEVICE FOR TRANSMITTING MESSAGE SIGNALS

BACKGROUND OF THE INVENTION

1. Field of the Invention

The invention relates to a communication device for the transmission of information signals via transmission lines having a central coupling arrangement with associated line assemblies, where a "1:N" redundancy group comprising N active line assemblies and a standby line assembly allows one of the N active line assemblies to be switched to standby via a selection device.

2. Description of the Related Art

Depending on the required reliability against Different redundancy assemblies associated with a communication device, depending on the required reliability against failure for this device. Examples of these redundancy structures are "1+1", "1:1" and "1:N" line assembly redundancy, as is described in "IEEE Journal on Selected Areas in Communications" Vol. 15, No. 5, June 1997, pages 795 to 806. In the case of a "1+1" redundancy structure, two line assemblies are operated in parallel, in order to transmit information signal streams over them in a redundant manner. In this situation, however, only one of these redundant information signal streams is considered for further processing.

In the case of "1:1" line assembly redundancy, only one of two line assemblies is used as the active line assembly; a changeover is made to the remaining line assembly, which is used as a standby assembly, only if a fault occurs in the active line assembly.

Finally, in the case of "1:N" line assembly redundancy, a single standby line assembly is provided in addition to a plurality N of line assemblies. If a fault occurs on one of the N line assemblies, the standby line assembly is then used instead of this line assembly.

In the case of "1:N" line assembly redundancy, a selector arrangement is generally connected between the line assemblies and the external transmission lines. This selector arrangement can distribute the individual transmission lines between the N line assemblies and the standby line assembly. This prior art will be described in more detail below, in conjunction with FIG. 1. However, it is noted that if such a selector arrangement fails, or when this selector arrangement is replaced as a result of such a failure, all of the transmission lines connected to it, and thus the connections running via it, are interrupted.

The object of the present invention is to provide a way in which a communication device can be designed for the transmission of information signals via transmission lines having a central coupling arrangement with associated line assemblies, where a "1:N" redundancy group comprising N active line assemblies and a standby line assembly allows one of the N active line assemblies to be switched to standby via a selection device, in order to improve the reliability against failure over the above prior art when using "1:N" line assembly redundancy.

In the case of the above communication device, this object is achieved by the selection device of a respective "1:N" redundancy group having N signal connections on a first connection side, and only one individual signal connection on a second connection side that is connected to the standby line assembly, and where line-specific switches are inserted into each of the transmission lines that selectively connect the respective transmission line via a first switching path to the active line assembly associated with it, or via a second switching path to one of the N signal connections of the selection device, and where the selection device and the N switch can be controlled such that, in the normal mode, the N transmission lines are connected directly via the first switching paths of the line-specific switch to the N active line assemblies, while, when one of the N active line assemblies is in the standby mode, its associated transmission line is connected via the second switching path of the associated switch and the selection device to the standby line assembly.

The invention results in the advantage that, by designing and arranging the selection device and switch within a "1:N" redundancy group, this selection device can be replaced during normal operation of the communication device without adversely affecting the normal operation. When the communication device is in the standby mode, replacement of the selection device affects only the transmission path which is currently switched to standby.

Advantageous refinements of the invention result when the communications device is designed as an ATM communication device which operates using an asynchronous transfer mode and allows the transmission of information signals in the course of virtual connections, and where the coupling arrangement is assigned a central control device that controls setting up and clearing of virtual connections. An advantage may also be found when the central control device is designed such that it can control the selection device and the line-specific switch of the respective "1:N" redundancy group.

The selection device may also have test loops for each of the N signal connections which, in the normal mode, each allow the insertion of one test loop from and to the coupling arrangement. The central control device can also be designed so that it effectuates a controls of both the insertion of the associated test loop, and then the conduct of a loop test, to be controlled individually for the test loop.

The adjacent line assemblies of a "1:N" redundancy group can be connected to one another via a control line for emitting a fault message, and the line assemblies may be designed in such a manner that they emit, upon receipt of such a fault message, a control signal which requires the activation of a standby mode to the central control device. Finally, the line-specific switches may be implemented in the form of a PIN diode switch.

BRIEF DESCRIPTION OF THE DRAWINGS

The present invention will be explained in more detail in the following text with reference to drawings, by way of example:

FIG. 2 is a block diagram showing a detail of the schematic design of a communication device according to the present invention, using the example of a normal mode, and FIG. 3 is a block diagram showing the communication device illustrated in FIG. 2, for a standby mode.

DESCRIPTION OF THE PREFERRED EMBODIMENTS

Figure 1:
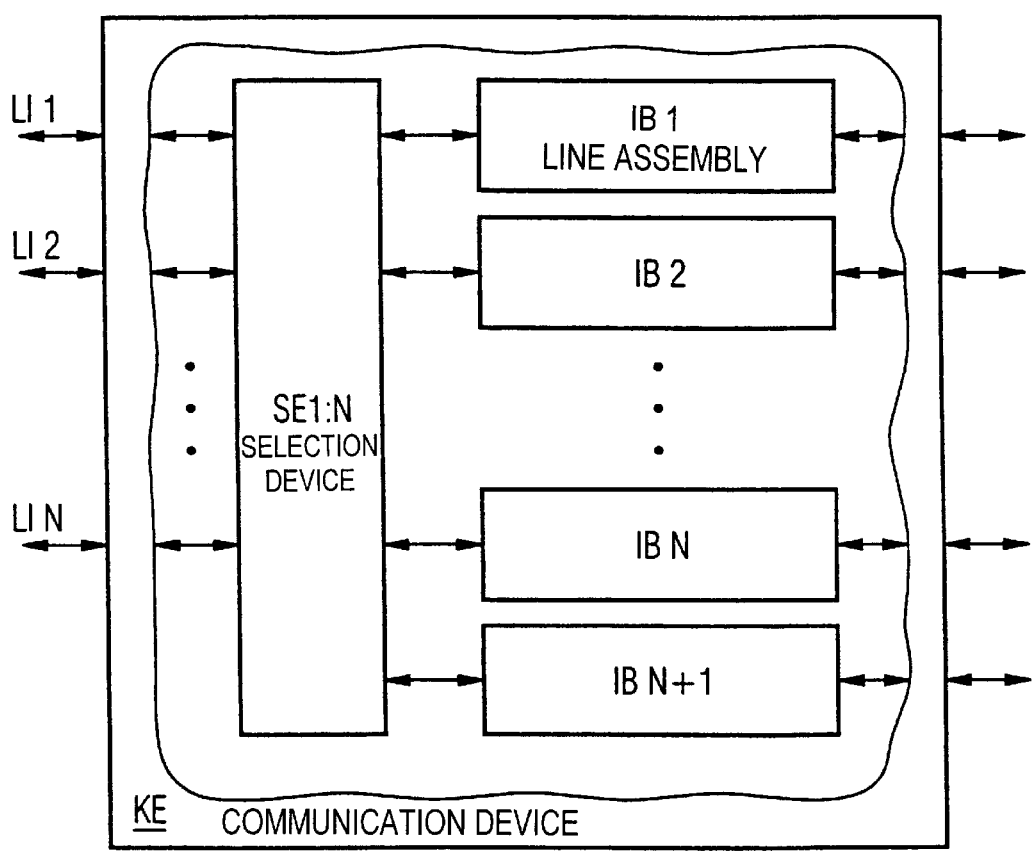
FIG. 1 is a block diagram showing a detail of the schematic design of a communication device according to the prior art.

As an example, FIG. 1 shows a detail of a communication device KE which operates using an asynchronous transfer mode (ATM). In accordance with this ATM principle, information signals are transmitted in a known manner in the form of information cells, in the course of virtual connections. For such a transmission, the communication device KE is connected to a plurality N of transmission lines, which are denoted by LI 1 to LI N. The interface to these N transmission lines, which may be designed, for example, bidirectionally as electrical lines, form N line connections of selection device SE 1:N of the communication device KE. These selection device are connected via a further N+1 line connections to N+1 line assemblies, which are denoted in FIG. 1 by IB 1 to IB N+1, and form a "1:N" redundancy group. In this case, in the normal mode, i.e.,—therefor; during fault-free operation of the line assemblies, the line assemblies IB 1 to IB N, for example, are connected as active line assemblies to the transmission lines LI 1 to LI N with the aid of these selection device. The remaining line assembly IB N+1 is, in contrast, used as a standby line assembly. When a fault occurs in one of the active line assemblies, the selection device are then switched in such a manner that the transmission path which previously ran between the faulty line assembly (for example IB 1) and the associated transmission line (LI 1) now runs via the standby line assembly IB N+1.

The communication device KE which has been explained with reference to FIG. 1 has the disadvantage that, when such a selector arrangement fails, or when this selector arrangement is replaced as a result of failure, all of the transmission lines (LI 1 to LI N) connected to it, and thus the connections running via it, are interrupted.

A communication device according to the present invention which avoids these disadvantages and likewise has a "1:N" redundancy structure for the line assemblies, is explained in more detail in the following text with reference to FIGS. 2 and 3. FIG. 2 shows the normal mode of the communication device, while FIG. 3 shows its standby mode. These figures show only those elements of the communication device which are necessary for understanding the present invention.

The communication device KE illustrated in FIG. 2 may be an ATM communication device which operates using the asynchronous transfer mode and allows transmission of information signals in the form of information cells in the course of virtual connections; this well-known ATM transmission principle will not be described further.

The communication device KE has a central coupling arrangement ASN, to which a central control device MPU is assigned, in order to control it. This communication device may be a "cross connect" for setting up virtual fixed connections, or a switching device (switching node) for setting up virtual dialed connections. In both cases, the connections are set up from the central control device MPU. However, since this process of setting up connections is not the subject matter of the present invention, it will not be described further.

A plurality of line assemblies are connected to the central coupling arrangement ASN via, for example, bidirectional electrical connections. A number N+1 of these line assemblies are indicated which, as will be explained in more detail below, form a "1:N" redundancy group and are denoted by BG 1 to BG N+1. The line assemblies BG 1 to BG N are each intended for the connection of one peripheral transmission line. The transmission lines are denoted by LTG 1 to LTG N, corresponding to their association with the line assemblies. Line-specific switching means, which are each denoted by S, are inserted into these transmission lines, and, in the exemplary embodiment, are in the form of PIN diode switches due to their high reliability against failure (a low Failure in time (Fit) value) respective line assembly is connected to the associated transmission line via a first switching path, which is indicated in FIG. 2. A second switching path of the respective switch S connects the associated transmission line to one of N signal connections on a first connection side of selection device SEL 1:N. On the other hand on a second connection side of the selection device, the previously mentioned line assembly BG N+1 is connected only to a single signal connection and is used, as explained below, as a standby line assembly.

Internally, the selection device SEL 1:N have a schematically illustrated "1:N" switch arrangement, for example, in the form of a data selector. The previously mentioned N signal connections can be connected to the individual signal connection likewise mentioned above—selectively via N individual switches in this switch arrangement. In FIG. 2, the N switches are shown open. Furthermore, the selection device SEL 1:N have a separate test loop arrangement LB for each of the N signal connections.

The switch S and the selection device SEL 1:N are controlled by the central control device MPU. For this purpose, the required control signals are initially transmitted in the form of information cells in the course of a permanently set up virtual connection to the standby line assembly BG N+1, with an internal transport protocol (ITP) being used for this purpose. The control information contained in the information cells is then passed on, for example, via a serial I2C bus (indicated by dashed lines in FIG. 2) running between the standby line assembly and the selection device. Control signals for the switch S are derived from the I2C bus information in the selection device SEL 1:N, and are then passed to the switch S via individual control lines. Apart from this, the individual test loop arrangements LB on the selection device are each likewise controlled via said I2C bus by said standby line assembly BG N+1. The control information is transmitted from the central control device MPU (via the fixed virtual connection).

FIG. 2 illustrates the situation in which the communication device KE is operated in the normal mode, i.e., particularly where the line assemblies are operating without any faults. In this normal mode, the transmission lines LTG 1 to LTG N are connected by the line-specific switch S to the line assemblies BG 1 to BG N, in order to transmit information signals (information cells) in the normal way within the communication device KE. In this normal mode, apart from the above, the switch S is respectively controlled by the associated line assembly (BG 1 to BG N), to pass information to the line assemblies. If there is a fault in a line assembly, control signals, however, switch off the associated switch so that, in a manner which will be described in more detail below, a standby circuit can be produced to the selection device SEL 1:N.

The "1:N" selection device for line assemblies can be checked from the central control device MPU without any adverse effect on normal operation of the communication device KE. To do this, the central control device MPU can transmit control signals in the manner mentioned above via the standby line assembly BG N+1 in order, on the one hand, to close a selected switch within the "1:N" switch arrangement of the selection device SEL 1:N and, on the other hand, to insert a test loop via the test loop arrangement LB connected downstream of this switch. In order to avoid high signal losses, the individual test loops can be provided by a relay.

After this, for example, a defined test signal can be passed from the central control device MPU via the standby line assembly of the currently activated test loop, and can be transmitted back from there to the central control device. A test can be repeated periodically in a defined sequence by all the test loop arrangement LB of the selection device SEL 1:N. In this way, the serviceability "1:N" selection mechanism can be checked at defined time intervals.

As is also indicated in FIG. 2, respectively adjacent line assemblies BG 1 to BG N are connected directly via a bidirectional control line OL. Furthermore, there is a fixed virtual connection between each of the line assemblies, via the coupling arrangement ASN, to the central control device MPU. When a fault occurs in one of the line assemblies, a control signal is transmitted to the adjacent line assembly via the control line OL in question, and is passed on from there via the virtual connection to the central control device MPU. When such a control signal is received, the central control device MPU then selects the standby mode for the faulty line assembly. Such a standby mode will be explained in the following text with reference to FIG. 3, with the line assembly BG 1 being represented as a faulty line assembly, by way of example.

According to FIG. 3, the switch S associated with the line assembly BG 1 are controlled such that their second switching path, mentioned above, is activated for the signal connection in question for the selection device SEL 1:N. Furthermore, within this selection device, the switch associated with the present signal connection is controlled in such a manner that a closed connection path now exists from the transmission line LTG 1 and via the selection device SEL 1:N to the standby line assembly BG N+1. Information signals (information cells) can thus now be transmitted via this standby line assembly, as a substitute for the faulty line assembly BG 1 assumed by way of example. Such a standby mechanism also applies to all the other line assemblies BG 2 to BG N.

The communication device KE explained with reference to FIGS. 2 and 3 can also be modified such that the selection device SEL 1:N is connected, like a line assembly to the coupling arrangement ASN (indicated by a dashed line in FIGS. 2 and 3), and is connected to the central control device MPU via a fixed virtual connection. The control of the selection device SEL 1:N itself and of the line-specific switch S is initiated by control signals (transmission using the internal transport protocol ITP) which are transmitted by the central control device MPU in the course of the virtual connection. Based on these control signals, the previously mentioned "1:N" switch arrangement, the individual test loop arrangements LB and the individual switches in the line-specific switch S can then be set within the selection device SEL 1:N. In order to set the last-mentioned switches, the above mentioned individual control lines can be provided between the switches and the selection device SEL 1:N, as is indicated by dashed lines in FIGS. 2 and 3.

A further modification of the communication device KE may also comprise a plurality of independent redundancy groups being formed from the line assemblies in the manner described above, when a large number of line assemblies are present. These redundancy groups each have a specific number of active line assemblies, and a standby line assembly assigned to them.

Finally, although the present invention has been explained above using an exemplary ATM communication device, the invention is not limited to such a device. This invention can also be used in communication devices which do not use the ATM principle, as long as a "1:N" redundancy structure can be provided for the line assemblies in these devices.

What is claimed is:

1. A communication device for the transmission of information signals via transmission lines, comprising:
a central coupling arrangement;
line assemblies which are associated with said coupling arrangement, wherein each line assembly is connected to one of said the transmission lines;
a 1:N redundancy group comprising:
a number N of active said line assemblies,
an additional standby said line assembly,
a selection device comprising N signal connections on a first connection side, and only one signal connection on a second connection side, said second connection being connected to said standby line assembly, wherein each of said active line assemblies can be switched to standby via said associated standby line assembly, and via said selection device;
line-specific switches that are inserted into each of said transmission lines which selectively connect the respective said transmission line via a first switching path to an active said line assembly associated with it, or via a second switching path to one of said N signal connections of said selection device;
wherein said selection device and said N switches are controlled in a normal mode, and a standby mode;
wherein in said normal mode, said N transmission lines are connected directly via said first switching paths to said N active line assemblies; and
wherein, when one of said N active line assemblies is in said standby mode, its associated transmission line is connected via said second switching path of said associated switch and said selection device to said standby line assembly.

2. The communication device as claimed in claim 1, wherein:
said communication device is an ATM communication device which operates using an asynchronous transfer mode and allows said transmission of information signals in the course of virtual connections; and
said coupling arrangement is assigned a central control device which controls a setting up and clearing of virtual connections.

3. The communication device as claimed in claim 2, wherein:
said central control device controls said selection device and said line-specific switch of the respective "1:N" redundancy group.

4. The communication device as claimed in claim 1, wherein said selection device further comprises:
test loops for each of said N signal connections which, in said normal mode, each allow the insertion of one test loop from and to said coupling arrangement.

5. The communication device as claimed in claim 4, wherein:
said central control device controls both the insertion of the associated test loop and then the conduct of a loop test, to be controlled individually for said test loop.

6. The communication device as claimed in claim 2, wherein
said line assemblies are connected to one another via a control line for emitting a fault message; and
said line assemblies emit a control signal which requires the activation of a standby mode to the central control device on receipt of said fault message.

7. The communication device as claimed in claim 2, wherein
said line-specific switches are in the form of a PIN diode switch.

* * * * *